Figure 7:
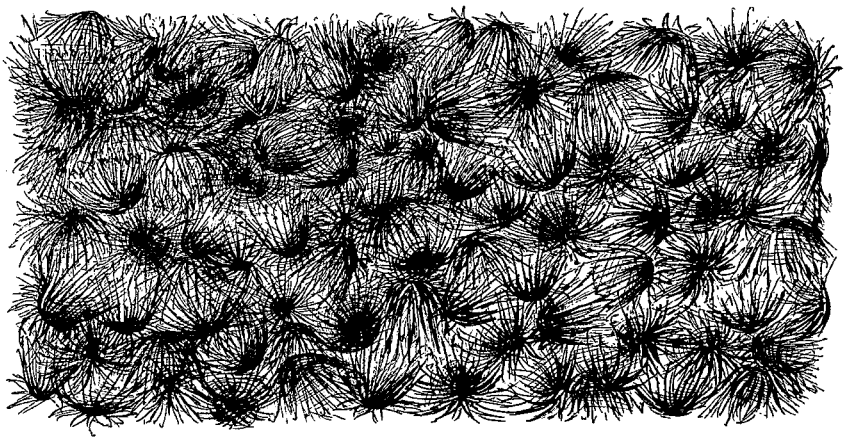

2 Sheets—Sheet 1
W. PHILLIPS.
Stuffing for Upholstery.
No. 213,446. Patented Mar. 18, 1879.
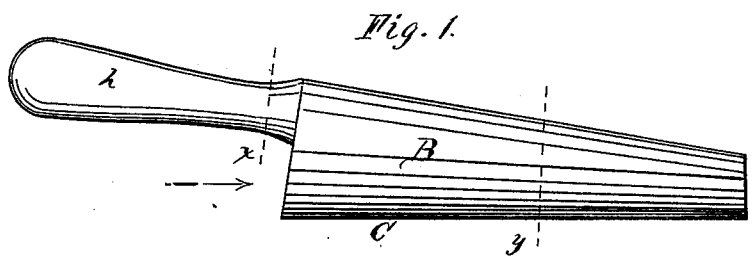
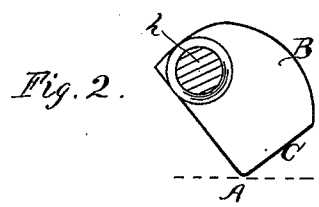 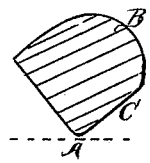
 
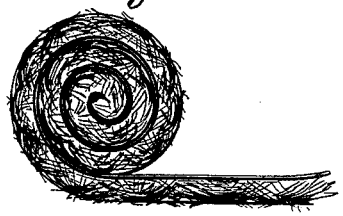
Witnesses.
Benjamin Smith
Henry P. White
Inventor.
Wm. Phillips
By Wm. S. Loughborough
Atty.

2 Sheets—Sheet 2.

W. PHILLIPS.
Stuffing for Upholstery.

No. 213,446. Patented Mar. 18, 1879.

Witnesses:
Will W. Dodge.
Daniel C. Twitchell

Inventor:
William Phillips
By Dodgerson
Atty.

UNITED STATES PATENT OFFICE.

WILLIAM PHILLIPS, OF MUMFORD, NEW YORK.

IMPROVEMENT IN STUFFING FOR UPHOLSTERY.

Specification forming part of Letters Patent No. 213,446, dated March 18, 1879; application filed December 17, 1877.

*To all whom it may concern:*

Be it known that I, WM. PHILLIPS, of Mumford, in the county of Monroe and State of New York, have invented a new and useful Stuffing for Upholstery; and I do hereby declare that the following is a full, clear, and exact description thereof, reference being had to the accompanying drawings, making part of this specification, in which—

Figure 1 is a longitudinal elevation of a hand-beater to be used in preparing the burrs. Figs. 2 and 3 are transverse sectional views on the dotted lines $x$ and $y$. Fig. 4 is a central section of an unopened burr containing the seeds. Fig. 5 is a similar view of a prepared burr, having discharged its seed by thrashing or beating. Fig. 6 represents a portion of a sheet of the prepared burrs partially rolled up. Fig. 7 is a face view of a portion of the completed sheet.

The object of my invention is to provide a cheap and durable stuffing for upholstery as a substitute for the more expensive materials heretofore employed for such purposes.

It consists in the employment therefor of the burrs from the *Lappa major*, or common burdock.

The burrs are gathered after becoming sufficiently ripe to freely discharge their seeds by proper beating or thrashing. The method of thus preparing them, when conducted by hand, is preferably performed about as follows: I place two thicknesses of oil-cloth upon a flat marble or stone slab. This constitutes a suitable bed upon which to beat the burrs. The hand-beater I prefer to make about as shown in the drawings, having two beater-faces and one angular edge, each to be used for different portions of the beating process, and in the following order, viz: angle or edge A first, the oval face B next, and the flat face C for the third or last beating. This beater is preferably made about as long as the width of the slab employed. The latter should be somewhat longer and wider than the area of the largest cushions to be prepared upon it.

Any desired quantity of the burrs, according to the size of the cushion for which they are intended, are placed on the covered slab, and may be partially spread. They are then beaten with the angle A, which, when performed over the entire surface, forms a sort of sheet of the burrs, causing them at the same time to open and discharge their seeds. One edge of this sheet is then raised, and the thrashed seeds carefully brushed from under it by a small rod or stick. This should be repeated after each beating. The next beating may be performed with the oval or rounded face B of the beater. This still further spreads the mat or sheet of burrs, and releases more of the seeds, which are swept off the slab, as before. The plain flat face C of the beater is then employed, and the operation of beating, &c., repeated. Several sheets are placed together to form any desired thickness of cushion.

This prepared stuffing may be employed in general upholstery, and for commercial purposes the sheets should be separated by a sheet of thin paper.

The burrs may be prepared in a more rapid manner by being passed through a beating or thrashing cylinder provided with longitudinal beater-bars, or with either conical-shaped teeth or swinging or spring teeth; and the concave may have its inner surface provided with diagonal or oblique grooves, either with or without teeth.

Whether the beating is performed by hand or with a machine, care must be taken not to tear the burrs to pieces, it being desirable to simply open them sufficiently to discharge the seeds without detaching or separating the scales or bracts, the spring or elasticity of which and the form of the burr affording the lively character to the completed cushion.

What I claim as my invention is—

As a new article of stuffing for upholstery, the prepared burr of the *Lappa major*, or common burdock, substantially as set forth.

WM. PHILLIPS.

Witnesses:
WM. S. LOUGHBOROUGH,
A. L. MABBETT.